US011428593B2

(12) United States Patent
Bhat et al.

(10) Patent No.: US 11,428,593 B2
(45) Date of Patent: Aug. 30, 2022

(54) METHODS AND APPARATUSES FOR PROVIDING FREEZE RESISTANT SENSING ASSEMBLY

(71) Applicant: Honeywell International Inc., Morris Plains, NJ (US)

(72) Inventors: Lokesha Bhat, Karnataka (IN); Palani Thanigachalam, Karnataka (IN); Vijaya Krishna N K, Karnataka (IN); Vijayakumar S, Karnataka (IN); Shridhara Shanbhogue, Karnataka (IN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 260 days.

(21) Appl. No.: 16/689,933

(22) Filed: Nov. 20, 2019

(65) Prior Publication Data
US 2021/0148775 A1 May 20, 2021

(51) Int. Cl.
G01L 9/00 (2006.01)
G01L 19/06 (2006.01)

(52) U.S. Cl.
CPC .......... *G01L 9/0044* (2013.01); *G01L 9/0048* (2013.01); *G01L 19/0645* (2013.01)

(58) Field of Classification Search
None
See application file for complete search history.

(56) References Cited

U.S. PATENT DOCUMENTS

| 4,776,219 A | 10/1988 | Friedrich | |
| 5,237,957 A * | 8/1993 | Liucci | G01L 19/12 116/267 |
| 10,488,289 B2 * | 11/2019 | Liu | G01L 19/02 |
| 2003/0019298 A1 | 1/2003 | Scheurich et al. | |
| 2008/0148807 A1 * | 6/2008 | Berry | G01L 19/0038 73/1.57 |
| 2014/0345389 A1 * | 11/2014 | Kim | G01L 19/0038 73/700 |
| 2016/0054192 A1 | 2/2016 | Kachenko et al. | |

(Continued)

FOREIGN PATENT DOCUMENTS

| CN | 203745125 U | 7/2014 |
| CN | 106124116 A | 11/2016 |
| CN | 108827529 A | 11/2018 |

(Continued)

OTHER PUBLICATIONS

Extended European Search Report issued in European Application No. 20207037.1 dated Apr. 16, 2021, 7 pages.

(Continued)

*Primary Examiner* — Peter J Macchiarolo
*Assistant Examiner* — Jermaine L Jenkins
(74) *Attorney, Agent, or Firm* — Alston & Bird LLP

(57) ABSTRACT

Methods and apparatuses related to freeze resistant sensing assemblies are provided. An example pressure sensing assembly may include: a first member defining an aperture, the aperture comprising an inner opening disposed on an inner surface of the first member and an outer opening disposed on an outer surface of the first member; a protection diaphragm disposed on the inner surface of the first member; and a sensing diaphragm disposed in a second member fastened to the first member.

20 Claims, 5 Drawing Sheets

(56) References Cited

U.S. PATENT DOCUMENTS

2017/0292890 A1    10/2017    Liu et al.
2018/0180505 A1*    6/2018    Zipp .................... G01L 7/041

FOREIGN PATENT DOCUMENTS

| CN | 110017939 A |   | 7/2019 |   |             |
|----|-------------|---|--------|---|-------------|
| EP | 3128305 A1  | * | 2/2017 | . | G01L 19/142 |
| EP | 3376188 A1  |   | 9/2018 |   |             |
| WO | WO-2005029029 A1 | * | 3/2005 | . | G01L 19/0038 |
| WO | 2018/186107 A1 |   | 10/2018 |   |          |

OTHER PUBLICATIONS

CN Office Action dated Mar. 29, 2022 for CN Application No. 202011286567.
English Translation of CN Office Action dated Mar. 29, 2022 for CN Application No. 202011286567.

\* cited by examiner

METHODS AND APPARATUSES FOR PROVIDING FREEZE RESISTANT SENSING ASSEMBLY

FIELD OF THE INVENTION

The present disclosure relates generally to methods, apparatuses, and systems associated with sensing assemblies, and more particularly, to methods, apparatuses, and systems for providing freeze resistant sensing assemblies.

BACKGROUND

Sensors may detect and/or measure a physical property from a physical environment. For example, a pressure sensor may act as a transducer and may generate a signal as a function of the detected/measured pressure. Pressure sensors may be used in various applications. For example, pressure sensors may be used in connection with water pumps, paint sprayers, agricultural irrigation systems and natural gas drilling systems to detect and/or measure the water pressure.

However, existing sensors are plagued by challenges and limitations. Continuing from the above example, if the temperature drops below the freezing temperature, water inside these systems may freeze and become ice, causing a stress overload on the pressure sensor. As a result, the pressure sensor may be damaged, degraded, and/or may produce inaccurate readings.

BRIEF SUMMARY

In accordance with various embodiments of the present disclosure, an example pressure sensing assembly may be provided. In some examples, the example pressure sensing assembly may comprise a first member comprising an aperture, a protection diaphragm, and a sensing diaphragm. In some examples, the aperture may define an inner opening disposed on an inner surface of the first member and an outer opening disposed on an outer surface of the first member. In some examples, the protection diaphragm may be disposed on the inner surface of the first member and may cover the inner opening of the aperture. In some examples, the sensing diaphragm may be disposed in a second member that is fastened to the first member. In some examples, the sensing diaphragm and the protection diaphragm may at least partially form a protection cavity.

In some examples, the first member may comprise a flow tunnel. In some examples, the flow tunnel may define a tunnel opening on the inner surface of the first member. In some examples, the protection diaphragm may comprise a diaphragm opening overlapping with the tunnel opening.

In some examples, the flow tunnel may be connected to the protection cavity through the tunnel opening. In some examples, the flow tunnel may receive a fluid substance.

In some examples, the protection diaphragm may reduce a force from the fluid substance when the fluid substance solidifies.

In some examples, the pressure sensing assembly may further comprise a header component disposed in the second member. In some examples, the header component and the sensing diaphragm may at least partially form a sensing cavity.

In some examples, the pressure sensing assembly may comprise a sensing die disposed in the sensing cavity. In some examples, the sensing die may be mounted on a surface of the header component.

In some examples, the pressure sensing assembly may comprise an isolation liquid disposed in the sensing cavity. In some examples, the pressure sensing assembly may comprise a liquid insert component disposed in the second member. In some examples, the liquid insert component may supply isolation liquid in the sensing cavity.

In some examples, the sensing cavity may be in a vacuum state.

In some examples, the sensing die may be electronically coupled to a sensing circuitry. In some examples, the sensing circuitry may comprise a Wheatstone bridge circuit.

In some examples, the sensing diaphragm may transfer a force from the fluid substance to a sensing die.

In some examples, the pressure sensing assembly may comprise a cap component attached to the sensing diaphragm. In some examples, the cap component may comprise at least one cap opening.

In some examples, the protection diaphragm may be welded on the first member.

In some examples, the protection diaphragm may be attached to the first member through an adhesive material.

In some examples, the second member may be fastened to the first member through threaded fitting.

In some examples, the pressure sensing assembly may comprise a third member that is fastened to the second member. In some examples, the third member may receive a power source.

In accordance with various embodiments of the present disclosure, an example pressure sensing assembly may be provided. In some examples, the example pressure sensing assembly may comprise a flow tunnel disposed in a first member, at least one spring-loaded component, and a sensing diaphragm disposed in a second member. In some examples, the second member may be fastened to the first member. In some examples, the flow tunnel may comprise a tunnel opening on an inner surface of the first member. In some examples, the flow tunnel may receive a fluid substance. In some examples, the at least one spring-loaded component may be disposed on the inner surface of the first member surrounding the tunnel opening. In some examples, the at least one spring-loaded component and the sensing diaphragm may at least partially form a protection cavity to receive the fluid substance through the tunnel opening.

In some examples, the at least one spring-loaded component may reduce a force from the fluid substance when the fluid substance solidifies. In some examples, the at least one spring-loaded component comprises at least one spring component connected to a washer component.

In accordance with various embodiments of the present disclosure, an example pressure sensing assembly may be provided. In some examples, the example pressure sensing assembly may comprise a flow tunnel disposed in a first member and a sensing diaphragm disposed in a second member. In some examples, the second member may be fastened to the first member. In some examples, the flow tunnel may receive a fluid substance and may comprise a tunnel opening on an inner surface of the first member. In some examples, the inner surface of the first member and the sensing diaphragm may at least partially form a protection cavity to receive the fluid substance through the tunnel opening. In some examples, the example pressure sensing assembly may comprise a bellows component disposed in the protection cavity.

In some examples, the bellows component may reduce a force from the fluid substance when the fluid substance solidifies.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1A:
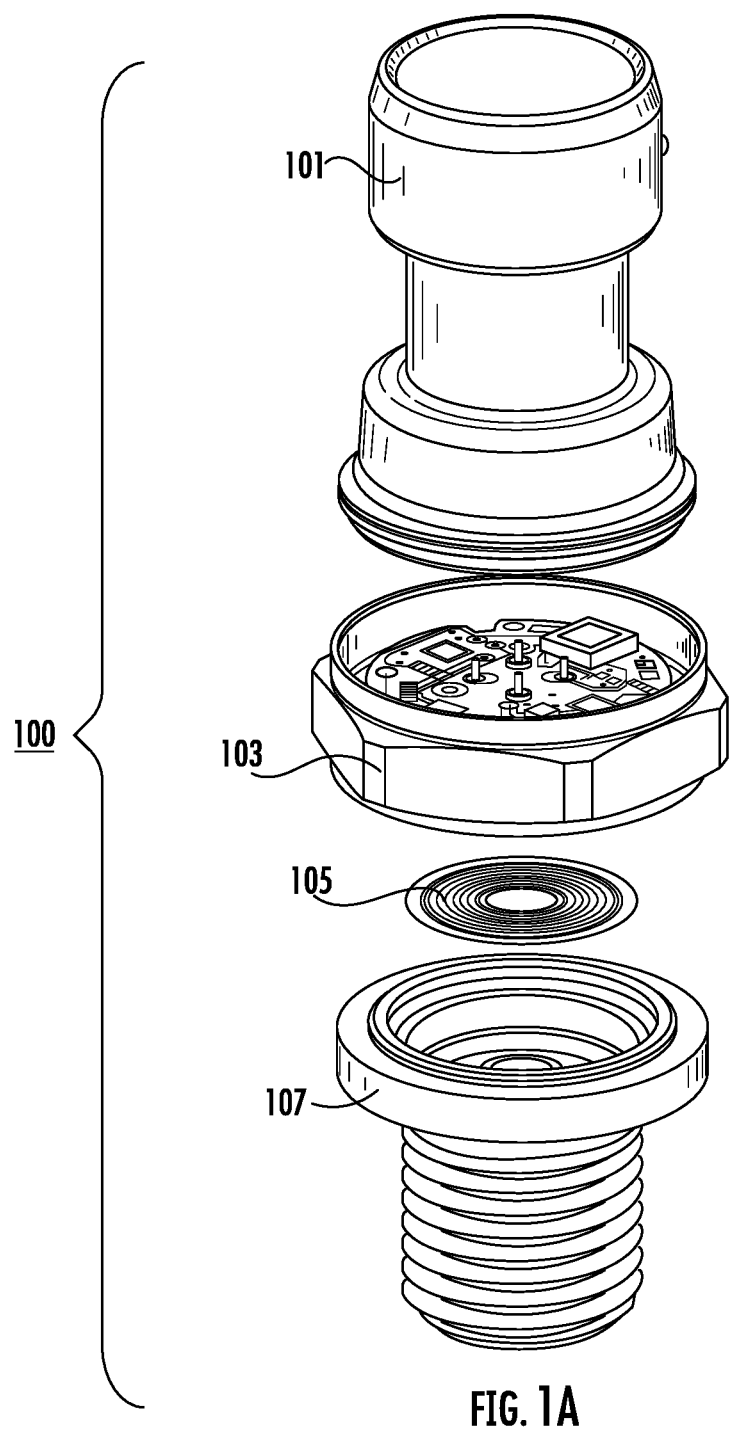
FIG. 1A illustrates an example view of an example apparatus in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The phrases "in one embodiment," "according to one embodiment," "in some examples," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "as an example," "in some examples," "often," or "might" (or other such language) be included or have a characteristic, that specific component or feature is not required to be included or to have the characteristic. Such component or feature may be optionally included in some embodiments, or it may be excluded.

The term "electronically coupled" in the present disclosure refers to two or more components (for example, but not limited to, sensing die) and/or electric circuit(s) (for example, but not limited to, sensing circuitry) being connected through wired means (for example but not limited to, conductive wires or traces) and/or wireless means (for example but not limited to, electromagnetic field), such that data and/or information may be transmitted to and/or received from the components that are electronically coupled.

The term "sensing assembly" refers to a device or module that may detect events, changes, and/or stimulus (such as pressure, motion, sound, temperature) in its environment and generate an output. Example sensing assembly may include, but not limited to, pressure sensor, temperature sensor, ultrasound sensor, and/or the like.

As described above, sensing assembly may be in contact with a fluid substance which may, for example, be measured by the sensing assembly. When the temperature drops below the freezing temperature of the fluid substance, the fluid substance may solidify in and/or around the sensing assembly, as well as in the associated hardware interface (such as a pipe connected to the pressure sensor). The volumetric expansion during the fluid solidification (for example, water turning into ice) may cause excessive forces to be exerted both within internal portions of the sensing assembly as well as on external portions of the sensing assembly that are exposed to the fluid substance. In some examples, these excessive forces can be hundreds to thousands of times more than the maximum allowed pressure on the sensing assembly, leading to significant damage to the sensing assembly. For example, these forces may cause tears on the sensing assembly, which may in turn cause internal fluid to leak from the sensing assembly. As result, the sensing assembly may degrade and fail over time, producing inaccurate readings or no readings at all.

To address these challenges and limitations, a pressure sensor may comprise sealing liquid (for example, silicone gel, elastomer, or emulsified lubricant) that may isolate a sensing diaphragm of a pressure sensor from the fluid substance that the pressure sensor measures. In this example, the sealing liquid may displace air and seal a cavity that is at least partially formed by the sensing diaphragm, thus preventing fluid substance from contacting the sensing diaphragm and settling in the cavity. Once injected, the sealing liquid may adhere to the inner walls of the cavity and may form a thin skin on the surface of the cavity to prevent itself from leaking out of the cavity when the pressure sensor is mounted in an upright position. When pressure from the fluid substance is introduced, the sealing liquid may serve as a transmission medium, exerting a force upon the sensing diaphragm equal to the force exerted upon the sealing liquid by the fluid sub stance.

However, with the addition of sealing liquid, the pressure sensor may not be suitable for low pressure sensing. In addition, the sealing liquid may degrade with continuing exposure to the fluid substance. Further, pressure transferred through the sealing liquid may have an offset error, which may cause repeatability variation and response time delay.

In contrast, various examples of the present disclosure may overcome these challenges and limitations. For example, an example sensing assembly may include a protection diaphragm that may absorb and/or reduce the expansion force during fluid solidification and prevent damage to the sensing assembly.

Figure 1B:
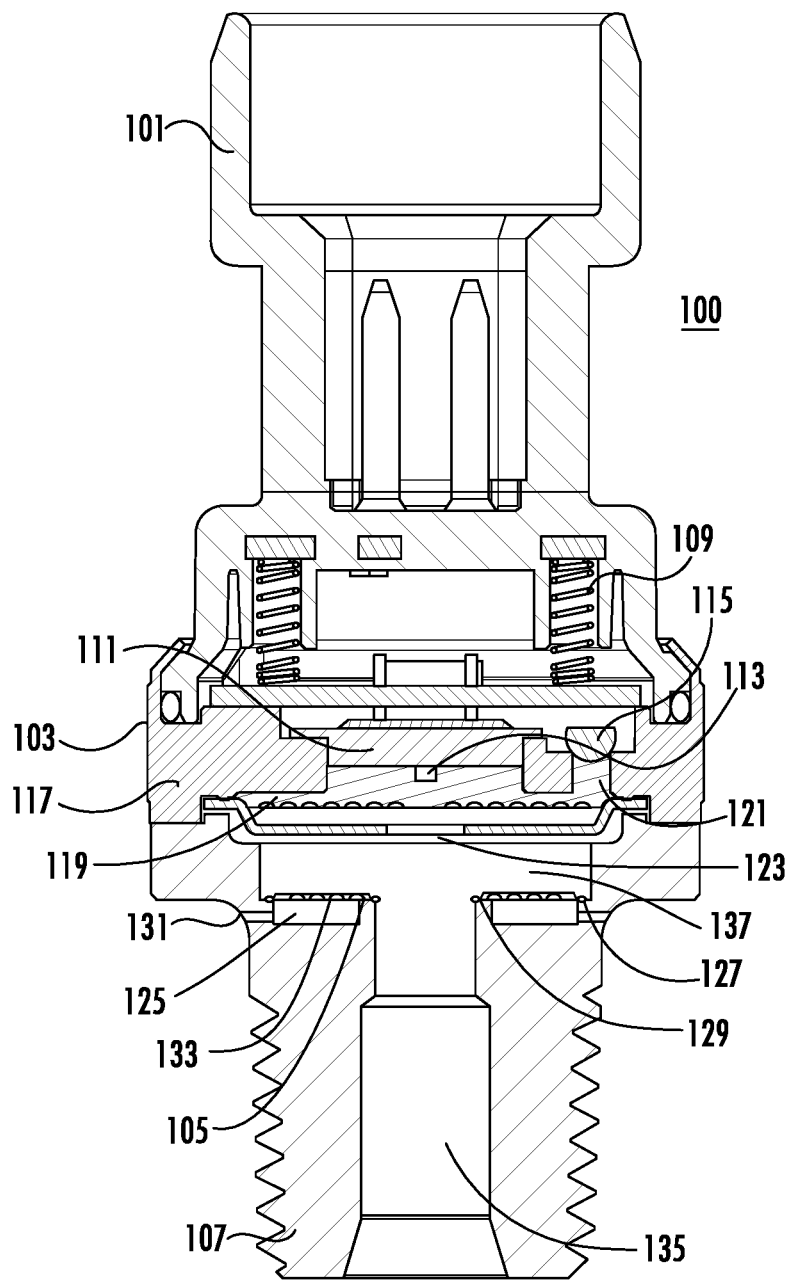
FIG. 1B illustrates an example view of an example apparatus in accordance with various embodiments of the present disclosure.

Referring now to FIG. 1A and FIG. 1B, various example views of an example apparatus in accordance with various embodiments of the present disclosure are shown. In the example shown in FIG. 1A and FIG. 1B, the example apparatus may take the form of an example pressure sensing assembly 100.

FIG. 1A illustrates an example exploded view of the example pressure sensing assembly 100.

In some examples, the pressure sensing assembly 100 may comprise a first member 107. In the example shown in FIG. 1A, the first member 107 may be in the form of a port connector that may connect and/or secure the pressure sensing assembly 100 to a hardware interface. The term "hardware interfaces" refers to structure or architecture that may connect two apparatus together. Example hardware interfaces may include, but not limited to, tubes, pipes, vents and/or the like.

In some examples, the first member 107 may comprise one or more fastening mechanisms to enable a secured connection between the first member 107 and the hardware interface. Example fastening mechanisms may include, but are not limited to, mechanical fastening mechanisms (such as threaded fitting or threaded coupling), magnetic fastening mechanisms (such as through magnetic field), material flexing mechanisms (such as tire coupling), and/or the like.

For example, the first member 107 may comprise a plurality of threads on an inner surface (i.e. female threaded fitting) and/or a plurality of threads an outer surface (i.e. male threaded fitting). In this example, the corresponding hardware interface (for example, a tube) may comprise corresponding threads on its outer surface to be fastened with the threads on the inner surface of the first member 107. Additionally, or alternatively, the corresponding hardware interface may comprise corresponding threads on its inner surface to be fastened with the threads on the outer surface of the first member 107. In other words, the first member 107 may be fastened and/or secured to the hardware interface through threaded fitting so that substance to be measured (for example, water in a water pipe) may flow from the hardware interface to the pressure sensing assembly 100.

In some examples, the first member 107 may be in a shape corresponding to the hardware interface that the pressure sensing assembly 100 is designed to be connected to. For example, the first member 107 may be in a hollow cylindrical shape so that the pressure sensing assembly 100 may be connected to a water pipe. In some examples, the first member 107 may be in other shapes, such as, but not limited to, a prism shape, a polyhedron shape, a cone shape, and/or the like.

In some examples, the first member 107 may comprise stainless steel material. Additionally, or alternatively, other materials may be used, including, but not limited to, carbon steel, aluminum, cooper, polyvinyl chloride (PVC), and/or the like.

In the example shown in FIG. 1A, the pressure sensing assembly 100 may, additionally or alternatively, comprise a second member 103. In some examples, the second member 103 may comprise a housing component 117 (as shown in FIG. 1B) that may provide an enclosure for one or more mechanical components and/or electronic components, such as, but not limited to, a sensing diaphragm 119 (as shown in FIG. 1B), a sensing die 113 (as shown in FIG. 1B), and/or one or more sensing circuitries. Example details of these components are described in connection with at least FIG. 1B.

Similar to the first member 107 described above, the second member 103 may comprise one or more fastening mechanisms to enable a secured connection between the second member 103 and the first member 107. Example fastening mechanisms may include, but are not limited to, mechanical fastening mechanisms (such as threaded fitting or threaded coupling), magnetic fastening mechanisms (such as through magnetic field), material flexing mechanisms (such as tire coupling), and/or the like.

For example, the second member 103 may be fastened and/or secured to the first member 107 through threaded fittings, similar to the example fastening mechanisms between the first member 107 and the hardware interface described above. As another example, the second member 103 may be in the form of a threaded coupler that connects the first member 107 and the third member 101. As another example, the second member 103 may comprise a lip portion protruding from the circumference of the second member 103, and the first member 107 may comprise a corresponding groove portion on the circumference of the first member 107. In this example, the second member 103 may be fastened and/or secured to the first member 107 through lip and groove mating. Additionally, or alternatively, the second member 103 may comprise other fastening mechanisms that may provide a secured connection to the first member 107 and/or the third member 101.

In some examples, the second member 103 may be in a hexagon ring shape. In some examples, the second member 103 may be in other shapes, such as, but not limited to, a cube shape, a sphere shape, a pyramid shape, and/or the like.

In some examples, the second member 103 may comprise stainless steel material. Additionally, or alternatively, other materials may be used, including, but not limited to, carbon steel, aluminum, cooper, polyvinyl chloride (PVC), and/or the like.

In the example shown in FIG. 1A, the pressure sensing assembly 100 may, additionally or alternatively, comprise a third member 101. In some examples, the third member 101 may connect one or more mechanical components and/or electronic components in the second member 103 to one or more components that are external to the pressure sensing assembly 100.

For example, the third member 101 may receive a power source to supply power to, for example, the electronic components disposed in the second member 103. In this example, the third member 101 may comprise an electrical connector (such as a power plug). Additionally, or alternatively, the third member 101 may comprise data communication means (such as wired or wireless means) to transfer data and/or information between the electronic components disposed in the second member 103 and components external to the pressure sensing assembly 100 (such as a microcontroller).

In some examples, the third member 101 may comprise one or more fastening mechanisms to enable a secured connection between the third member 101 and the second member 103. Example fastening mechanisms may include, but are not limited to, mechanical fastening mechanisms (such as threaded fitting or threaded coupling), magnetic fastening mechanisms (such as through magnetic field), material flexing mechanisms (such as tire coupling), and/or the like. For example, the third member 101 may be fastened to the second member 103 through a lip and groove mating, similar to the example fastening mechanisms between the second member 103 and the first member 107 described above.

In some examples, the third member 101 may be in a hollow cylindrical shape. In some examples, the third member 101 may be in other shapes, such as, but not limited to, a cube shape, a sphere shape, a pyramid shape, and/or the like.

In some examples, the third member 101 may comprise stainless steel material. Additionally, or alternatively, other materials may be used, including, but not limited to, carbon steel, aluminum, cooper, polyvinyl chloride (PVC), and/or the like.

In the example shown in FIG. 1A, the pressure sensing assembly 100 may comprise a protection diaphragm 105. In some examples, the protection diaphragm 105 may be disposed on an inner surface of the first member 107, example details of which are described in connection with at least FIG. 1B.

While the example illustrated in FIG. 1A may include three separate members (i.e. the first member 107, the second member 103, and the third member 101), it is noted that the scope of the present disclosure is not limited to three separate members only. Examples in accordance with the present disclosure may include fewer than or more than three separate members. For example, the first member 107 may be integrated with the second member 103 to form a single member. Additionally, or alternatively, the second member 103 may be integrated with the third member 101 to form a single member. Additionally, or alternatively, additional member(s) may be included in examples of the present disclosure.

Referring now to FIG. 1B, an example sectional view of the example pressure sensing assembly 100 is illustrated.

In some examples, the pressure sensing assembly 100 may comprise a flow tunnel 135 disposed in the first member 107. As described above, the first member 107 may connect and/or secure the pressure sensing assembly 100 to a hardware interface so that a fluid substance may flow into and be in contact with the pressure sensing assembly 100. For example, the first member 107 may be connected to a tube through one or more fastening mechanisms (for example, threaded fitting as described above) and may measure the pressure of a fluid substance in a tube. In this example, after the first member 107 is connected to the tube, the flow tunnel 135 may receive the fluid substance from the tube.

In some examples, the flow tunnel 135 may comprise a tunnel opening on an inner surface of the first member 107. Continuing from the above example, after the flow tunnel 135 receives the fluid substance from the tube, the fluid substance may flow through the tunnel opening onto the inner surface of the first member 107. In some examples, the tunnel opening may allow mechanical components and/or electronic components within the pressure sensing assembly 100 to detect and/or measure the pressure of the fluid substance, example details of which are described herein.

As described above, the first member 107 may be fastened to the second member 103. In the example shown in FIG. 1B, the second member 103 may comprise a housing component 117 that may provide a lip portion, and the first member 107 may comprise a corresponding grove portion. In this example, the second member 103 and the first member 107 may be fastened through lip and groove mating. As another example, the second member 103 may comprise a threaded end that may provide a secured connection to the first member 107 through threaded fitting.

Continuing from the above example, as the flow tunnel 135 may comprise a tunnel opening on an inner surface of the first member 107, and the first member 107 may be fastened to the second member 103, the fluid substance received from the flow tunnel 135 may be in contact with an inner surface of the second member 103.

In some examples, the pressure sensing assembly 100 may comprise a sensing diaphragm 119 disposed in the second member 103. For example, the sensing diaphragm 119 may be disposed on an inner surface of the second member 103. In some examples, the sensing diaphragm 119 may be welded on the inner surface of the second member 103. In some examples, the sensing diaphragm 119 may be attached to the second member 103 through an adhesive material. Example adhesive material may include, but not limited to, cyanoacrylate adhesives, polyurethane glue, and/or the like.

In some examples, the sensing diaphragm 119 may be in the form of a membrane that may seal and/or isolate a sensing cavity 121 from the fluid substance received from the flow tunnel 135. For example, the inner surface of the second member 103 may comprise a sensing opening, and the sensing diaphragm 119 may cover the sensing opening. The sensing diaphragm 119 may provide part of inner wall for the sensing cavity 121 and may at least partially form the sensing cavity 121.

In some examples, the sensing diaphragm 119 may comprise material having durability characteristics, including, but not limited to, stainless steel, titanium, and/or the like. In some examples, the sensing diaphragm 119 may comprise material having flexibility characteristics, including, but not limited to, elastomers.

In some examples, the sensing diaphragm 119 may be a convoluted diaphragm. For example, the sensing diaphragm 119 may be in a circular shape, and may have a molded curved section that is concentric with the circumference of the sensing diaphragm 119. In some examples, the sensing diaphragm 119 may be a non-convoluted diaphragm having a flat surface.

Referring back to FIG. 1B, the second member 103 may comprise a header component 111 disposed in the second member 103. In some examples, the header component 111 may comprise material having durability characteristics, including, but not limited to, titanium, stainless steel, and/or the like.

The header component 111 and the sensing diaphragm 119 may at least partially form a sensing cavity 121. For example, a surface of the header component 111 may provide part of inner wall for the sensing cavity 121. In some examples, the pressure sensing assembly 100 may comprise an isolation liquid disposed in the sensing cavity 121. The isolation liquid may comprise, for example, silicon oil. Additionally, or alternatively, the isolation liquid may comprise other substance, including, but not limited to, paraffin, liquid crystal polymer, and/or the like.

In some examples, the pressure sensing assembly 100 may comprise a liquid insert component 115 disposed in the second member 103. In such examples, the liquid insert component 115 may comprise an insert opening, and may supply the isolation liquid into the sensing cavity 121.

In some examples, the sensing cavity 121 may be air-evacuated. In such examples, the entire sensing cavity 121 may be filled with the isolation liquid. In some examples, the sensing cavity 121 may be in a vacuum state. In such examples, the sensing cavity 121 may be devoid of the isolation liquid or any other matter.

In some examples, the pressure sensing assembly 100 may comprise a sensing die 113. The sensing die 113 may be mounted on a surface of the header component 111 and may be disposed in the sensing cavity 121. As described above, the sensing cavity 121 may be filled with isolation liquid. In this example, the sensing die 113 may be submerged in the isolation liquid.

As described above, the sensing diaphragm 119 may seal and/or otherwise isolate the sensing cavity 121 from the fluid substance received from the flow tunnel 135. To detect and/or measure the pressure of the fluid substance, the sensing diaphragm 119 may transfer a force from the fluid substance to a sensing die 113 through, for example, the isolation fluid disposed in the sensing cavity 121. For example, when the fluid substance contacts the sensing diaphragm 119, the pressure from the fluid substance may be exerted on the sensing diaphragm 119. As described above, the sensing diaphragm 119 may be a convoluted diaphragm, which may allow a greater diaphragm travel when pressure is applied as compared to that of a non-convoluted diaphragm. The sensing diaphragm 119 may at least particularly form the sensing cavity 121, and the isolation liquid may be disposed in the sensing cavity 121, which may serve as transmission fluid that may transfer pressure from the sensing diaphragm 119 to the sensing die 113.

In some examples, the sensing die 113 may be a strain gauge that may generate signals corresponding to the detected pressure. For example, the sensing die 113 may be a silicon sensor die that may measure pressure based on the piezo-resistive effect. In this example, the sensing die 113 may comprise a silicon diaphragm. When mechanical pressure is applied on the silicon diaphragm, electrical resistivity of the sensing die 113 may change.

In some examples, the sensing die 113 may be electronically coupled to a sensing circuitry. In some examples, the sensing circuitry may comprise a network of resistors that may transform the change of electrical resistivity into an electrical signal that may be proportional to the mechanical pressure.

For example, the sensing circuitry may comprise a Wheatstone bridge circuit. The Wheatstone bridge circuit may cause electric current to run through the sensing die 113. As described above, when pressure is applied on the sensing die 113, electrical resistivity may change proportional to the pressure applied. When the electrical resistivity changes, less electric current may pass through the sensing die 113. The Wheatstone bridge circuitry may detect this change and may generate a signal that is proportional to the pressure.

In some examples, the sensing circuitry may be disposed on a surface of the header component 111 that may be opposite to the surface where the sensing die 113 is disposed. In other words, the sensing circuitry may be disposed outside the sensing cavity 121. In such example, the header component 111 may isolate the sensing circuitry from the pressure in the sensing cavity 121 so as to protect the electronic components in the sensing circuitry. As described above, the header component 111 may at least partially form the sensing cavity 121, and may comprise material having durability characteristics (such as stainless steel). In this example, when an impact force is transferred from the fluid substance to the isolation fluid in the sensing cavity 121 and further to the header component 111, the header component 111 may absorb and/or reduce the impact force.

In some examples, the third member 101 may connect the sensing circuitry to one or more components external to the pressure sensing assembly 100. For example, the third member 101 may connect the sensing circuitry to a microcontroller. Additionally, or alternatively, the third member 101 may receive a power source and supply power to the sensing circuitry. In some examples, the third member 101 may comprise springs 109 that may provide structural support.

In some examples, one or more additional circuitry may be electronically coupled to the sensing circuitry. For example, the pressure sensing assembly 100 may comprise external signal conditioning circuitry that is electronically coupled to the sensing circuitry. In some examples, various electronic components of the sensing circuitry and/or other circuitry may be calibrated and temperature-compensated for improving reading accuracy.

In some examples, the pressure sensing assembly 100 may comprise a cap component 123. The cap component 123 may be attached to the sensing diaphragm 119 and may comprise at least one cap opening. In some examples, when the pressure sensing assembly 100 is not in use, the cap component 123 may isolate the sensing diaphragm 119 from outside substance to protect the sensing diaphragm 119.

Continuing from the example above, when the temperature drops below the freezing temperature of the fluid substance, the fluid substance may solidify. During the solidification process, excessive forces may be exerted on a sensing diaphragm of an example pressure sensing assembly, which may cause tears on the sensing diaphragm and leaking of the isolation fluid from the sensing cavity. In this regard, example embodiments of the present disclosure may comprise the protection diaphragm 105 disposed on the inner surface of the first member 107.

In some examples, the protection diaphragm 105 may be welded on the first member 107. For example, the protection diaphragm 105 may be welded on the first member 107 at weld joints 127 and 129. In some examples, the protection diaphragm 105 may be attached to the first member 107 via adhesive material. Example adhesive material may include, but not limited to, cyanoacrylate adhesives, polyurethane glue, and/or the like.

In some examples, the protection diaphragm 105 may comprise material having durability characteristics, including, but not limited to, stainless steel, titanium, and/or the like. In some examples, the protection diaphragm 105 may comprise material having flexibility characteristics, including, but not limited to, elastomers.

In the example shown in FIG. 1B, the first member 107 may define at least one aperture, such as aperture 125. The aperture 125 may comprise an inner opening 133 disposed on an inner surface of the first member 107, as well as an outer opening 131 disposed on an outer surface of the first member 107. In some examples, the protection diaphragm 105 may cover the inner opening 133 of the aperture 125.

In some examples, the sensing diaphragm 119 and the protection diaphragm 105 may at least partially form a protection cavity 137. In other words, a surface of the sensing diaphragm 119 and a surface of the protection diaphragm 105 may provide inner wall for the protection cavity 137.

In some examples, the flow tunnel 135 may be connected to the protection cavity 137 through the tunnel opening on the inner surface of the first member 107. In some examples, the protection diaphragm 105 may comprise a diaphragm opening that may overlap or otherwise engage with the tunnel opening on the inner surface of the first member 107.

In some examples, the protection diaphragm 105 may be in a ring shape and have the diaphragm opening at the center, as well as convolutions on a surface of the protection diaphragm 105 that surround the diaphragm opening. In some examples, the protection diaphragm 105 may be welded at two locations of first member 107, as shown in FIG. 1B. As an example, the protection diaphragm 105 may be in a shape similar to an annulus, where the protection diaphragm 105 may comprise two concentric shapes: an inner circular shape and an outer circular shape. In some examples, the protection diaphragm 105 may be in other shapes that are concentric with each other, such as, but not limited to, an inner elliptical shape and an outer circular shape; an inner square shape and an outer circular shape; an inner triangular shape and an outer circular shape; and/or the like.

Continuing from the example above, the fluid substance may be received from the flow tunnel 135 to the protection cavity 137 through the tunnel opening and diaphragm opening. In instances in which the temperature drops below the freezing temperature of the fluid substance, the protection diaphragm 105 may absorb and/or reduce a force from the fluid substance as the fluid substance solidifies in the protection cavity 137.

For example, in instances in which ice forms within the protection cavity 137, an expansion force of the ice formation may be exerted upon the sensing diaphragm 119 and the protection diaphragm 105. The protection diaphragm 105 may expand in the aperture 125, which may absorb and/or reduce the expansion force. In some examples, the protection diaphragm 105 may push air out of the protection cavity 137 through the outer opening 131 of the aperture 125 and/or may expand through the aperture 125. As such, the protection diaphragm 105 may reduce stress on the sensing diaphragm 119 caused by the solidification of the fluid substance in the protection cavity 137, and may prevent damage to the sensing diaphragm 119.

As such, various embodiments of the present disclosure may overcome challenges and limitations associated with pressure sensors without causing degradation of the sensing diaphragm or impact on reliability, repeatability and accuracy of the sensor. In some examples, sensor replacement due to damage on the sensing diaphragm may be avoided, which may reduce the maintenance cost associated with the sensor.

In some examples, example pressure sensing assemblies in accordance with various embodiments may be used in a variety of industrial applications that may require improved accuracy and repeatability, such as, but not limited to, water pump, air compressor, and/or Heating, Ventilation and Air Conditioning (HVAC) systems. In some examples, example pressure sensing assemblies may provide compact sizes with improved ruggedness and durability, which may be used for providing discrete pressure measurement in fuel, gas, water, etc. In some examples, example pressure sensing assemblies may be suitable for environmental conditions that may suffer from hostile vibration, external shock, and/or extreme temperature.

Figure 2:
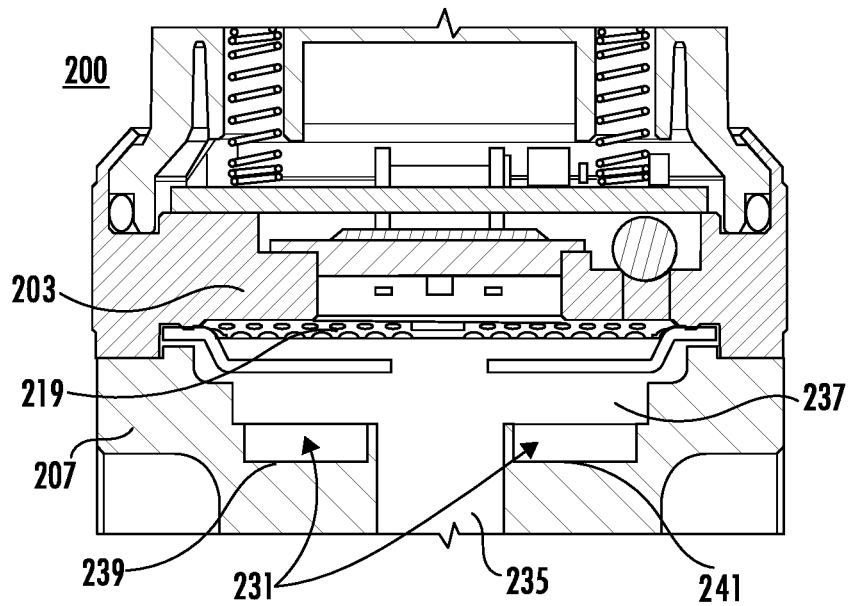
FIG. 2 illustrates an example view of an example apparatus in accordance with various embodiments of the present disclosure.

Referring now to FIG. 2, an example view of an example apparatus in accordance with various embodiments of the present disclosure is shown. In the example embodiment shown in FIG. 2, the example apparatus may take the form of an example pressure sensing assembly 200.

Similar to the pressure sensing assembly 100 described above in connection with FIG. 1A and FIG. 1B, the pressure sensing assembly 200 may comprise a flow tunnel 235 disposed in a first member 207. The flow tunnel 235 may receive a fluid substance, the pressure of which is to be measured by the pressure sensing assembly 200. As shown in FIG. 2, the flow tunnel 235 may comprise a tunnel opening on an inner surface of the first member 207.

In some examples, the pressure sensing assembly 200 may comprise at least one force absorbing component 231 disposed on the inner surface of the first member 207. In some examples, the at least one force absorbing component 231 may be disposed on the inner surface surrounding the tunnel opening. In some examples, the at least one force absorbing component 231 may comprise silicone gels. Additionally, or alternatively, other materials may be used for the at least one force absorbing component 231.

In some examples, the inner surface of the first member 207 may comprise at least one sunken portion (for example, sunken portions 239 and 241 shown in FIG. 2), which may be at a lower level than the surrounding area on the inner surface. In some examples, the at least one force absorbing component 231 may be disposed in the at least one sunken portion.

In some examples, the pressure sensing assembly 200 may comprise a sensing diaphragm 219 disposed in a second member 203, similar to those of the pressure sensing assembly 100 described above in connection with FIG. 1A and FIG. 1B. In some examples, the second member 203 may be fastened to the first member 207, similar to those of the pressure sensing assembly 100 described above in connection with FIG. 1A and FIG. 1B.

In some examples, the at least one force absorbing component 231 and the sensing diaphragm 219 may at least partially form a protection cavity 237. In some examples, the flow tunnel 235 may be connected to the protection cavity 237 through the tunnel opening disposed on the inner surface of the first member 207, and the protection cavity 237 may receive the fluid substance through the tunnel opening.

In some examples, when the temperature drops below the freezing temperature of the fluid substance, the at least one force absorbing component 231 may absorb and/or reduce a force from the fluid substance as the fluid substance solidifies in the protection cavity 237. For example, in instances in which ice forms within the protection cavity 137, an expansion force of the ice formation may be exerted upon the sensing diaphragm 219 and the at least one force absorbing component 231 (which may comprise silicone gel). The at least one force absorbing component 231 may dampen the force from the fluid substance, which may reduce the force on the sensing diaphragm 219. As such, the example pressure sensing assembly 200 may reduce the stress on the sensing diaphragm 219 caused by the solidification of the fluid substance.

Figure 3:
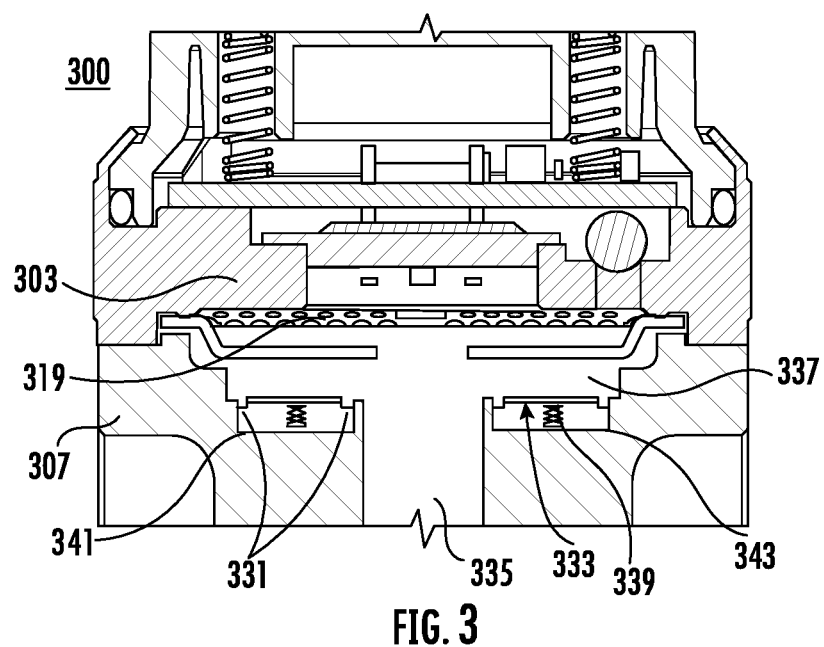
FIG. 3 illustrates an example view of an example apparatus in accordance with various embodiments of the present disclosure.

Referring now to FIG. 3, an example view of an example apparatus in accordance with various embodiments of the present disclosure is shown. In the example embodiment shown in FIG. 3, the example apparatus may take the form of an example pressure sensing assembly 300.

Similar to the pressure sensing assembly 200 described above in connection with FIG. 2, the pressure sensing assembly 300 may comprise a flow tunnel 335 disposed in a first member 307. The flow tunnel 335 may receive a fluid substance, the pressure of which is to be measured by the pressure sensing assembly 300. As shown in FIG. 3, the flow tunnel 335 may comprise a tunnel opening on an inner surface of the first member 307.

In some examples, the pressure sensing assembly 300 may comprise at least one spring-loaded component 339 disposed on the inner surface of the first member 307. In some examples, the at least one spring-loaded component 339 may be disposed on the inner surface surrounding the tunnel opening.

In some examples, the at least one spring-loaded component 339 may comprise at least one spring component, such as a coil spring. In some examples, the at least one spring component may be connected to a washer component 333, which may be a thin plate comprising stainless steel and/or other materials.

In some examples, the inner surface of the first member 307 may comprise at least one sunken portion (for example, sunken portions 341 and 343 shown in FIG. 3), which may be at a lower level than the surrounding area on the inner surface. In some examples, the at least one spring-loaded component 339 may be disposed in the at least one sunken portion. For example, the at least one spring-loaded component 339 may comprise at least one o-ring 331, which may comprise flexible material (such as elastomer) in the shape of a torus. In such an example, the at least one o-ring 331 may be attached to the periphery of the washer component 333. The at least one o-ring 331, together with the washer component 333, may isolate and/or otherwise seal the sunken portion of the inner surface.

In some examples, the at least one spring-loaded component 339 may be welded on the inner surface of the first member 307. For example, each spring of the at least one spring-loaded component 339 may be welded on the inner surface of the first member 307. In some examples, the at least one spring-loaded component 339 may be attached to the inner surface of the first member 307 through an adhesive material.

In some examples, the pressure sensing assembly 300 may comprise a sensing diaphragm 319 disposed in a second member 303, similar to those of the pressure sensing assembly 200 described above in connection with FIG. 2. In some examples, the second member 303 may be fastened to the first member 307, similar to those of the pressure sensing assembly 200 described above in connection with FIG. 2.

In some examples, the at least one spring-loaded component 339 and the sensing diaphragm 319 may at least partially form a protection cavity 337. In some examples, the flow tunnel 335 may be connected to the protection cavity 337 through the tunnel opening disposed on the inner surface of the first member 307, and the protection cavity 337 may receive the fluid substance through the tunnel opening.

In some examples, when the temperature drops below the freezing temperature of the fluid substance, the at least one spring-loaded component 339 may absorb and/or reduce a force from the fluid substance as the fluid substance solidifies in the protection cavity 337. For example, in instances in which ice forms within the protection cavity 137, an expansion force of the ice formation may be exerted upon the sensing diaphragm 219 and the washer component 333 of the at least one spring-loaded component 339. The at least one spring-loaded component 339 may compress, which may absorb and/or reduce the stress on the sensing diaphragm 319 caused by the solidification of the fluid substance.

Figure 4:
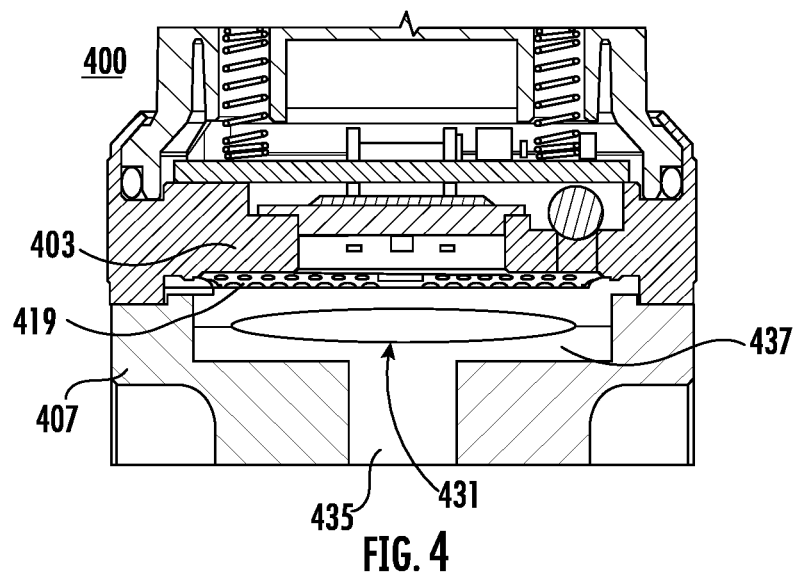
FIG. 4 illustrates an example view of an example apparatus in accordance with various embodiments of the present disclosure.

Referring now to FIG. 4, an example view of an example apparatus in accordance with various embodiments of the present disclosure is shown. In the example embodiment shown in FIG. 4, the example apparatus may take the form of an example pressure sensing assembly 400.

Similar to the pressure sensing assembly 300 described above in connection with FIG. 3, the pressure sensing assembly 400 may comprise a flow tunnel 435 disposed in a first member 407. The flow tunnel 435 may receive a fluid substance, the pressure of which is to be measured by the pressure sensing assembly 400. As shown in FIG. 4, the flow tunnel 435 may comprise a tunnel opening on an inner surface of the first member 407.

In some examples, the pressure sensing assembly 400 may comprise a sensing diaphragm 419 disposed in a second member 403, similar to those of the pressure sensing assembly 300 described above in connection with FIG. 3. In some examples, the second member 403 may be fastened to the first member 407, similar to those of the pressure sensing assembly 300 described above in connection with FIG. 3.

In some examples, the inner surface of the first member 407 and the sensing diaphragm 419 may at least partially form a protection cavity 437. In some examples, the flow tunnel 435 may be connected to the protection cavity 437 through the tunnel opening disposed on the inner surface of the first member 407, and the protection cavity 437 may receive the fluid substance through the tunnel opening.

In some examples, the pressure sensing assembly 400 may comprise at least one bellows component 431 disposed in the protection cavity 437. In some examples, the at least one bellows component 431 may comprise a metal bellows, which may be an elastic vessel that may be compressed when pressure is applied.

In some examples, the at least one bellows component 431 may be welded on the inner surface of the first member 307. For example, the at least one bellows component 431 may be welded in an axial direction that is perpendicular to an axial direction of the flow tunnel 435 on an inner surface of the first member 407 (for example, on an inner surface of a protection cavity). In some examples, the at least one bellows component 431 may be attached to an inner surface of the first member 407 (for example, to an inner surface of a protection cavity) through an adhesive material.

In some examples, when the temperature drops below the freezing temperature of the fluid substance, the at least one bellows component 431 may absorb and/or reduce a force from the fluid substance as the fluid substance solidifies in the protection cavity 437. For example, when forced is applied on the at least one bellows component 431, the at least one bellows component 431 may compress and absorb and/or reduce the force, and may reduce the stress on the sensing diaphragm 419 caused by the solidification of the fluid substance.

While the examples shown in FIG. 1A, FIG. 1B, FIG. 2, FIG. 3, and FIG. 4 illustrate example pressure sensing assemblies, it is noted that the scope of the present disclosure is not limited to pressure sensing assemblies only. For example, the protection diaphragm may be implemented in any sensing assembly that may comprise a sensing diaphragm and may be in contact with a fluid substance, including, but not limited to, ultrasound sensing assemblies.

Figure 5:
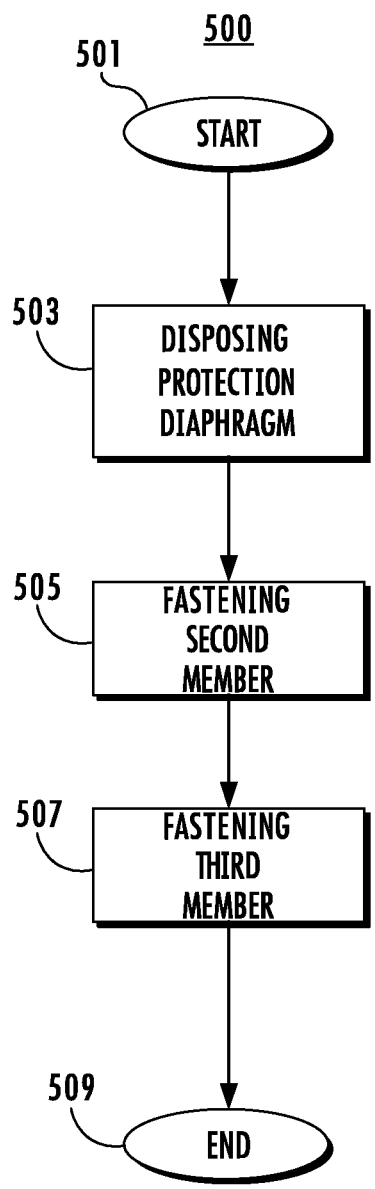
FIG. 5 illustrates an example flow chart in accordance with various embodiments of the present disclosure.

Referring now to FIG. 5, a method 500 in accordance with various embodiments of the present disclosure is provided. For example, the method 500 may illustrate examples of manufacturing and/or assembling example sensing assemblies in accordance with the present disclosure.

The method 500 may starts at block 501.

At block 503, the method 500 may comprise disposing a protection diaphragm on an inner surface of a first member, such as the protection diaphragm 105 disposed on the inner surface of the first member 107 as illustrated above in connection with FIG. 1A and FIG. 1B. In some examples, the protection diaphragm 105 may be welded on the inner surface of the first member 107, as described above. In some examples, the protection diaphragm 105 may be attached to the inner surface of the first member 107 through an adhesive material, as described above.

At block 505, the method 500 may comprise fastening a second member to the first member. For example, as illustrated in connection with FIG. 1A and FIG. 1B, the second member 103 may be fastened to the first member 107 through one or more fastening mechanisms. Once the second member 103 is fastened to the first member 107, the protection diaphragm 105 may at least partially form the protection cavity 137 for protecting the sensing diaphragm 119 on the second member 103 from excessive stress, as described above.

At block 507, the method 500 may comprise fastening a third member to the second member. For example, as illustrated in connection with FIG. 1A and FIG. 1B, the third member 101 may be fastened to the second member 103 through one or more fastening mechanisms. Once the third member 101 is fastened to the second member 103, the third member 101 may, for example, connect one or more mechanical components and/or electronic components in the second member 103 to one or more components external to the pressure sensing assembly 100, as described above.

The method 500 may end at block 509.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A pressure sensing assembly, comprising:
   a first member comprising an aperture and a flow tunnel, wherein the aperture defines an inner opening disposed on an inner surface of the first member and an outer opening disposed on an outer surface of the first member, wherein the flow tunnel defines a tunnel opening on the inner surface of the first member;
   a protection diaphragm disposed on the inner surface of the first member, wherein the protection diaphragm covers the inner opening of the aperture and comprises a diaphragm opening overlapping with the tunnel opening; and
   a sensing diaphragm disposed on the inner surface of a second member, wherein the second member is fastened to the first member, wherein the sensing diaphragm and the protection diaphragm at least partially form a protection cavity to receive a fluid substance, wherein the protection diaphragm reduces a force from the fluid substance when the fluid substance solidifies.

2. The pressure sensing assembly of claim 1, further comprising:
   a header component disposed in the second member, wherein the header component and the sensing diaphragm at least partially form a sensing cavity.

3. The pressure sensing assembly of claim 2, further comprising:
   a sensing die disposed in the sensing cavity and mounted on a surface of the header component.

4. The pressure sensing assembly of claim 3, further comprising:
   an isolation liquid disposed in the sensing cavity.

5. The pressure sensing assembly of claim 3, further comprising:
   a liquid insert component disposed in the second member and supplies isolation liquid in the sensing cavity.

6. The pressure sensing assembly of claim 3, wherein the sensing cavity is in a vacuum state.

7. The pressure sensing assembly of claim 3, wherein the sensing die is electronically coupled to a sensing circuitry.

8. The pressure sensing assembly of claim 7, wherein the sensing circuitry comprises a Wheatstone bridge circuit.

9. The pressure sensing assembly of claim 8, wherein the flow tunnel is connected to the protection cavity through the tunnel opening.

10. The pressure sensing assembly of claim 9, wherein the sensing diaphragm transfers a force from the fluid substance to the sensing die.

11. The pressure sensing assembly of claim 9, further comprising:
    a cap component attached to the sensing diaphragm, wherein the cap component comprises at least one cap opening.

12. The pressure sensing assembly of claim 1, wherein the protection diaphragm is welded on the first member.

13. The pressure sensing assembly of claim 1, wherein the protection diaphragm is attached to the first member through an adhesive material.

14. The pressure sensing assembly of claim 1, wherein the second member is fastened to the first member through threaded fitting.

15. The pressure sensing assembly of claim 1, further comprising:
    a third member being fastened to the second member, wherein the third member receives a power source.

16. A pressure sensing assembly, comprising:
    a flow tunnel disposed in a first member and receives a fluid substance, wherein the flow tunnel comprises a tunnel opening on an inner surface of the first member;
    at least one spring-loaded component disposed on the inner surface of the first member surrounding the tunnel opening;
    a protection diaphragm disposed on the inner surface of the first member, wherein the protection diaphragm covers an inner opening of an aperture of the first member and comprises a diaphragm opening overlapping with the tunnel opening; and
    a sensing diaphragm disposed in a second member, wherein the second member is fastened to the first member, wherein the at least one spring-loaded component and the sensing diaphragm at least partially form a protection cavity to receive the fluid substance through the tunnel opening.

17. The pressure sensing assembly of claim 16, wherein the at least one spring-loaded component reduces a force from the fluid substance when the fluid substance solidifies.

18. The pressure sensing assembly of claim 16, wherein the at least one spring-loaded component comprises at least one spring component connected to a washer component.

19. A pressure sensing assembly, comprising:
    a flow tunnel disposed in a first member and receives a fluid substance, wherein the flow tunnel comprises a tunnel opening on an inner surface of the first member;
    a sensing diaphragm disposed in a second member, wherein the second member is fastened to the first member, wherein the inner surface of the first member and the sensing diaphragm at least partially form a protection cavity to receive the fluid substance through the tunnel opening;
    a protection diaphragm disposed on the inner surface of the first member, wherein the protection diaphragm covers an inner opening of an aperture of the first member and comprises a diaphragm opening overlapping with the tunnel opening; and
    a bellows component disposed in the protection cavity.

20. The pressure sensing assembly of claim 19, wherein the bellows component reduces a force from the fluid substance when the fluid substance solidifies.

\* \* \* \* \*